US009120406B2

(12) United States Patent  
Sato et al.

(10) Patent No.: US 9,120,406 B2  
(45) Date of Patent: Sep. 1, 2015

(54) VEHICLE SEAT DEVICE

(71) Applicants: TS TECH CO., LTD., Asaka-shi, Saitama (JP); HONDA MOTOR CO., LTD., Minato-Ku, Tokyo (JP)

(72) Inventors: Takeshi Sato, Tochigi (JP); Hisato Oku, Wako (JP); Hiroki Ikeda, Wako (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/953,020

(22) Filed: Jul. 29, 2013

(65) Prior Publication Data

US 2014/0042785 A1   Feb. 13, 2014

(30) Foreign Application Priority Data

Aug. 7, 2012   (JP) ................................. 2012-175354

(51) Int. Cl.
*B60N 2/42*   (2006.01)
*B60N 2/68*   (2006.01)
(Continued)

(52) U.S. Cl.
CPC ............ *B60N 2/4228* (2013.01); *B60N 2/4613* (2013.01); *B60N 2/5825* (2013.01); *B60N 2/686* (2013.01)

(58) Field of Classification Search
CPC ..... B60N 2/4228; B60N 2/4613; B60N 2/686
USPC ......... 297/188, 14, 216.13, 216.14, 113, 238, 297/411.32, 452.18
See application file for complete search history.

(56) References Cited

U.S. PATENT DOCUMENTS 4,759,583 A * 7/1988 Schrom et al. ................ 297/113  
5,037,157 A * 8/1991 Wain et al. ............... 297/188.18

(Continued)

FOREIGN PATENT DOCUMENTS

CN   101674952 A   3/2010  
CN   102431475 A   5/2012

(Continued)

OTHER PUBLICATIONS

Japanese official communication dated Apr. 30, 2014 issued in corresponding JP Patent Application 2012-175354.

(Continued)

*Primary Examiner* — David R Dunn  
*Assistant Examiner* — Timothy J Brindley  
(74) *Attorney, Agent, or Firm* — Carrier Blackman & Associates, P.C.; Joseph P. Carrier; William D. Blackman

(57) ABSTRACT

A vehicle seat device includes: a seat back; an attached member pivotally supported by the seat back and configured to be turnable between a retracted position at which the attached member is housed in a housing recessed portion formed to penetrate a cushion pad of the seat back and a protruding position at which the attached member protrudes toward a front side of the seat back; and an inner board closing a rear opening face of the housing recessed portion. In the vehicle seat device, a locking claw bent forward is provided in an upper end portion of the inner board, and a stopper member configured to suppress frontward and downward movement of the locking claw by engaging with the locking claw is provided in a frame of the seat back. Such vehicle seat device is capable of restricting excessive forward movement and deformation of the inner board.

12 Claims, 12 Drawing Sheets

(51) Int. Cl.
*B60N 2/58* (2006.01)
*B60N 2/46* (2006.01)

(56) References Cited

U.S. PATENT DOCUMENTS

| | | | | |
|---|---|---|---|---|
| 5,129,707 | A * | 7/1992 | Yamauchi | 297/216.14 |
| 5,425,568 | A * | 6/1995 | Sliney et al. | 297/378.11 |
| 5,586,809 | A * | 12/1996 | Szmadzinski | 297/353 |
| 5,628,543 | A * | 5/1997 | Filipovich et al. | 297/113 |
| 5,752,739 | A * | 5/1998 | Saeki | 297/113 |
| 5,873,633 | A * | 2/1999 | Lang et al. | 297/411.32 |
| 5,947,554 | A * | 9/1999 | Mashkevich | 297/115 |
| 6,073,996 | A * | 6/2000 | Hatsuta et al. | 297/113 |
| 6,305,750 | B1 * | 10/2001 | Buono et al. | 297/440.2 |
| 6,386,577 | B1 * | 5/2002 | Kan et al. | 280/730.2 |
| 6,386,638 | B1 * | 5/2002 | Strauch | 297/452.18 |
| 6,439,597 | B1 * | 8/2002 | Harada et al. | 280/728.2 |
| 6,572,188 | B2 * | 6/2003 | Ozawa | 297/238 |
| 6,786,544 | B1 * | 9/2004 | Muraishi | 297/216.14 |
| 6,890,029 | B2 * | 5/2005 | Svantesson | 297/216.12 |
| 7,222,915 | B2 * | 5/2007 | Philippot et al. | 297/216.13 |
| 7,401,852 | B2 * | 7/2008 | Humer et al. | 297/216.13 |
| 8,136,878 | B2 * | 3/2012 | Nitsuma et al. | 297/216.14 |
| 8,602,492 | B2 * | 12/2013 | Nakaya et al. | 297/216.13 |
| 8,827,362 | B2 * | 9/2014 | Yamaki et al. | 297/216.13 |
| 8,864,224 | B2 * | 10/2014 | Kobayashi | 297/113 |
| 2003/0067200 | A1 * | 4/2003 | Habermann et al. | 297/337 |
| 2004/0140697 | A1 * | 7/2004 | Yuhki et al. | 297/113 |
| 2006/0163920 | A1 * | 7/2006 | Adams | 297/239 |
| 2008/0315637 | A1 * | 12/2008 | Ghisoni et al. | 297/216.13 |
| 2009/0295212 | A1 * | 12/2009 | Yamane et al. | 297/411.32 |
| 2010/0148561 | A1 | 6/2010 | Runde | |
| 2011/0316310 | A1 * | 12/2011 | Runde | 297/113 |
| 2012/0001462 | A1 * | 1/2012 | Cyoukyu et al. | 297/216.13 |
| 2012/0074741 | A1 | 3/2012 | Anderson | |
| 2012/0104822 | A1 * | 5/2012 | Henke et al. | 297/411.32 |
| 2012/0267933 | A1 * | 10/2012 | von Rothkirch und Panthen et al. | 297/411.32 |

FOREIGN PATENT DOCUMENTS

| | | |
|---|---|---|
| JP | 64-15560 U | 1/1989 |
| JP | 4-64250 U | 6/1992 |
| JP | H09-187342 A | 7/1997 |
| JP | 2001-211964 A | 8/2001 |
| JP | 2006-280747 A | 10/2006 |
| JP | 2008-194368 A | 8/2008 |

OTHER PUBLICATIONS

An Official Communication issued in the corresponding CN Patent Application 2013103084964 and dated May 4, 2015.

* cited by examiner

VEHICLE SEAT DEVICE

BACKGROUND OF THE INVENTION

1. Field of the Invention

The present invention relates to an improvement of a vehicle seat device comprising: a seat back; an attached member pivotally supported by the seat back and configured to be turnable between a retracted position at which the attached member is housed in a housing recessed portion formed to penetrate a cushion pad of the seat back and a protruding position at which the attached member protrudes toward a front side of the seat back; and an inner board closing a rear opening face of the housing recessed portion.

2. Description of the Related Art

Such a vehicle seat device is known as disclosed in Japanese Patent Application Laid-open No. 2001-211964.

SUMMARY OF THE INVENTION

In the vehicle seat device of Japanese Patent Application Laid-open No. 2001-211964, a cross member extending across a housing recessed portion is provided in a rear portion of a seat back to support an inner board closing a rear opening face of the housing recessed portion and an intermediate portion of the inner board is thus supported by a front surface of the cross member. In such a supporting structure for the inner board, for example, when luggage stored behind the seat back swiftly moves forward due to sudden braking of the vehicle, the cross member can stop the luggage and suppress forward movement of the inner board.

However, providing the cross member extending across the housing recessed portion in the rear portion of the seat back to support the intermediate portion of the inner board increases the number of parts in the vehicle seat device and makes it difficult to reduce the cost.

The present invention has been made in view of the circumstances described above and an object thereof is to provide a vehicle seat device capable of restricting excessive forward movement and deformation of an inner board due to application of a load from a rear side in a simple manner without the use of a cross member as described above.

In order to achieve the object, according to a first aspect of the present invention, there is provided a vehicle seat device comprising: a seat back; an attached member pivotally supported by the seat back and configured to be turnable between a retracted position at which the attached member is housed in a housing recessed portion formed to penetrate a cushion pad of the seat back and a protruding position at which the attached member protrudes toward a front side of the seat back; and an inner board closing a rear opening face of the housing recessed portion, wherein a locking claw bent forward is provided in an upper end portion of the inner board, and a stopper member configured to suppress frontward and downward movement of the locking claw by engaging with the locking claw is provided in a frame of the seat back. Note that the attached member corresponds to an armrest 7 in embodiments of the present invention to be described later.

According to the first aspect of the present invention, since the locking claw bent forward is provided in the upper end portion of the inner board and the stopper member configured to suppress the forward and downward movement of the locking claw by engaging with the locking claw is provided in the frame of the seat back, the forward and downward movement of the upper end portion of the inner board is restricted by the engagement and contact of the locking claw with the stopper member, when the inner board is bent forward due to a load from a rear side. This can suppress excessive forward movement and bending of the inner board and secure the durability of the inner board. Accordingly, no special load receiving member which receives a load from the rear side to protect the inner board needs to be provided in a rear opening portion of the housing recessed portion. Thus, the structure of the vehicle seat device is simplified and the cost can be thereby reduced.

According to a second aspect of the present invention, in addition to the first aspect, the upper end portion of the inner board is supported by a rear surface of the cushion pad of the seat back, a back panel with which the inner board comes into contact upon receiving an elastic rebound force of the cushion pad is fixedly attached to the frame, the stopper member is disposed to face the locking claw such that a predetermined distance exists between the stopper member and the locking claw in a normal state, and when the inner board is pressed and moved forward due to application of a load from a rear side, the locking claw deforms the cushion pad and then engages with the stopper member.

According to the second aspect of the present invention, the upper end portion of the inner board is supported by the rear surface of the cushion pad, the back panel with which the inner board comes into contact upon receiving the elastic rebound force of the cushion pad is fixedly attached to the frame of the seat back, the stopper member is disposed to face the locking claw such that the predetermined distance exists between the stopper member and the locking claw in a normal state, and when the inner board is pressed and moved forward due to application of the load from the rear side, the locking claw deforms the cushion pad and then engages with the stopper member. Accordingly, the inner board can be supported by utilizing the cushion pad and the back panel which are essentially included in the seat back. Hence, the structure of the vehicle seat device can be further simplified. In addition, the locking claw deforms the cushion pad before engaging with the stopper member, from a time point at which the inner board is pressed and moved forward due to application of the load from the rear side. This deformation alleviates engagement impact of the locking claw with the stopper member and the durability of the locking claw can be thereby improved.

According to a third aspect of the present invention, in addition to the first aspect, the locking claw is formed integrally with the inner board.

According to the third aspect of the present invention, since the locking claw is formed integrally with the inner board, there is no increase in the number of parts due to the locking claw and this can contribute to further simplification of the structure and reduction in cost.

According to a fourth aspect of the present invention, in addition to the third aspect, a reinforcement rib connecting the inner board and the locking claw are formed therebetween.

According to the fourth aspect of the present invention, since the reinforcement rib connecting the inner board and the locking claw is formed therebetween, bending between the inner board and the locking claw can be effectively suppressed.

According to a fifth aspect of the present invention, in addition to the fourth aspect, the inner board includes: a flat plate portion coming in contact with the back panel; an inclined portion bent forward from an upper end of the flat plate portion to avoid a supporting tube for a head rest, the supporting tube fixedly provided in an upper portion of the frame of the seat back; and a standing portion standing upright from an upper end of the inclined portion, the locking claw is formed integrally with an upper end of the standing portion, and three portions of the locking claw, the standing portion, and the flat plate portion are continuously connected together by the reinforcement rib.

According to the fifth aspect of the present invention, since the inner board includes: the flat plate portion coming in contact with the back panel; the inclined portion bent forward from the upper end of the flat plate portion to avoid the supporting tube for the head rest, the supporting tube fixedly provided in the upper portion of the frame of the seat back; and the standing portion standing upright from the upper end of the inclined portion, the interference between the inner board and the supporting tube for the head rest can be avoided. In addition, since the locking claw is formed integrally with the upper end of the standing portion and the three portions of the locking claw, the standing portion, and the flat plate portion are continuously connected together by the reinforcement rib, it is possible to effectively suppress bending of the three portions of the locking claw, the standing portion, and the flat plate portion and increase the stiffness of the locking claw.

According to a sixth aspect of the present invention, in addition to the fifth aspect, a plurality of the reinforcement ribs are linearly formed to extend across a valley portion between the inclined portion and the standing portion, and the reinforcement ribs are disposed between a pair of the supporting tubes provided respectively on left and right sides.

According to the sixth aspect of the present invention, since the plurality of the reinforcement ribs are linearly formed to extend across the valley portion between the inclined portion and the standing portion and the reinforcement ribs are disposed between the pair of the supporting tubes provided respectively on the left and right sides, the stiffness of the locking claw and a portion around a base thereof can be effectively increased while interference of the high reinforcement ribs with the supporting tubes is avoided.

According to a seventh aspect of the present invention, in addition to the first or third aspect, the stopper member is formed to have a circular section, and an inner surface of the locking claw formed to come into contact with an outer peripheral surface of the stopper member is formed to be an arc-shaped surface.

According to the seventh aspect of the present invention, since the stopper member is formed to have the circular section and the inner surface of the locking claw formed to come into contact with the outer peripheral surface of the stopper member is formed to be the arc-shaped surface, a sufficient engagement area between the locking claw and the stopper member is secured. Thus, it is possible to suppress an increase in engagement pressure and secure the durability of the locking claw.

According to an eighth aspect of the present invention, in addition to the first or third aspect, the locking claw is formed to be capable of engaging with a half of a periphery of the stopper member.

According to the eighth aspect of the present invention, since the locking claw is formed to be capable of engaging with the half of the periphery of the stopper member, it is possible to suppress the separation of the locking claw from the stopper member and suppress excessive movement and deformation of the inner board when the inner board is largely bent forward in the engagement of the locking claw with the stopper member.

DESCRIPTION OF THE PREFERRED EMBODIMENTS

In the following descriptions, front, rear, left, and right refer to directions of an automobile to which the present invention is applied as a vehicle.

Figure 1:
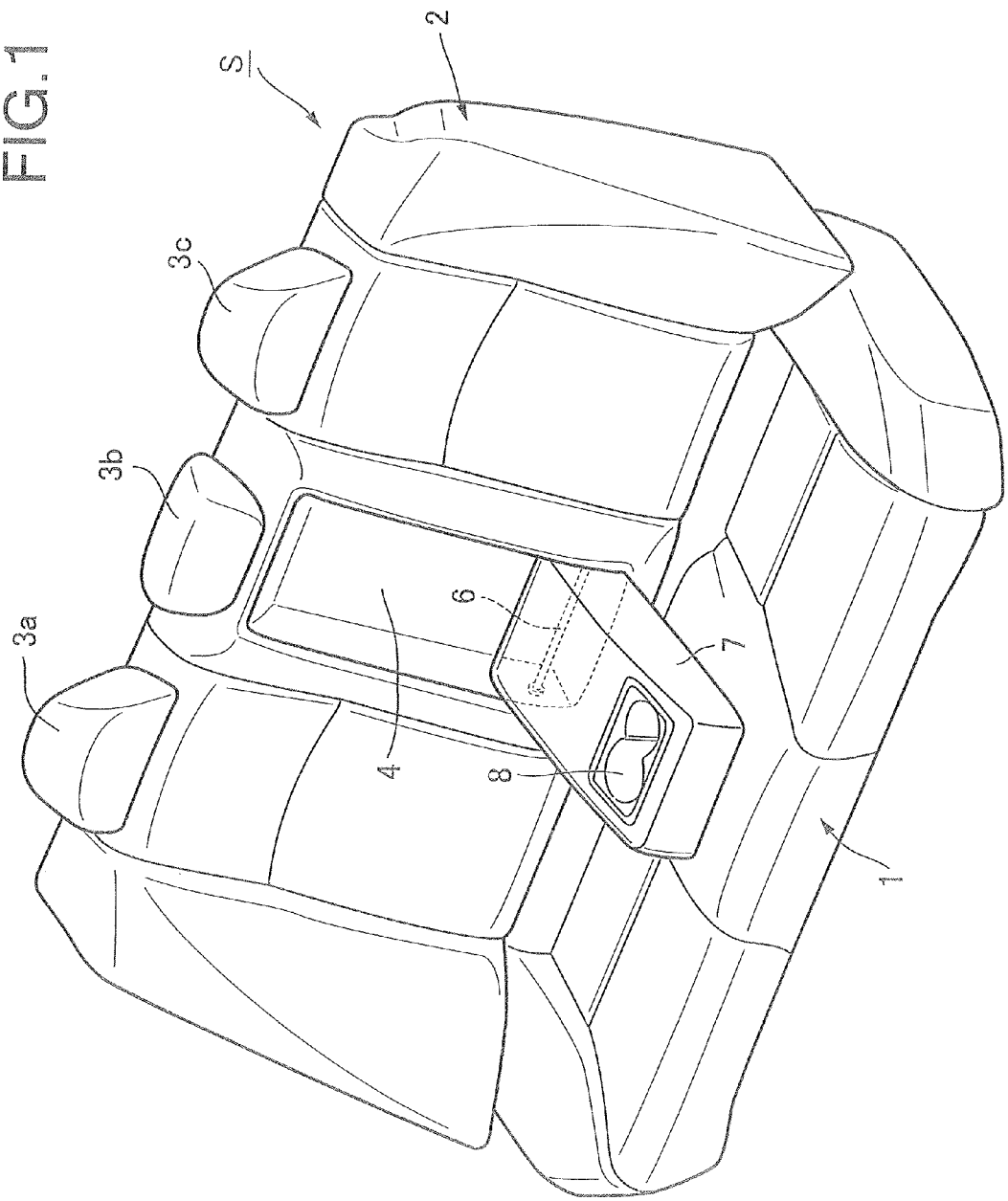
FIG. 1 is a front perspective view of an automobile seat device according to one embodiment of the present invention.
Figure 2:
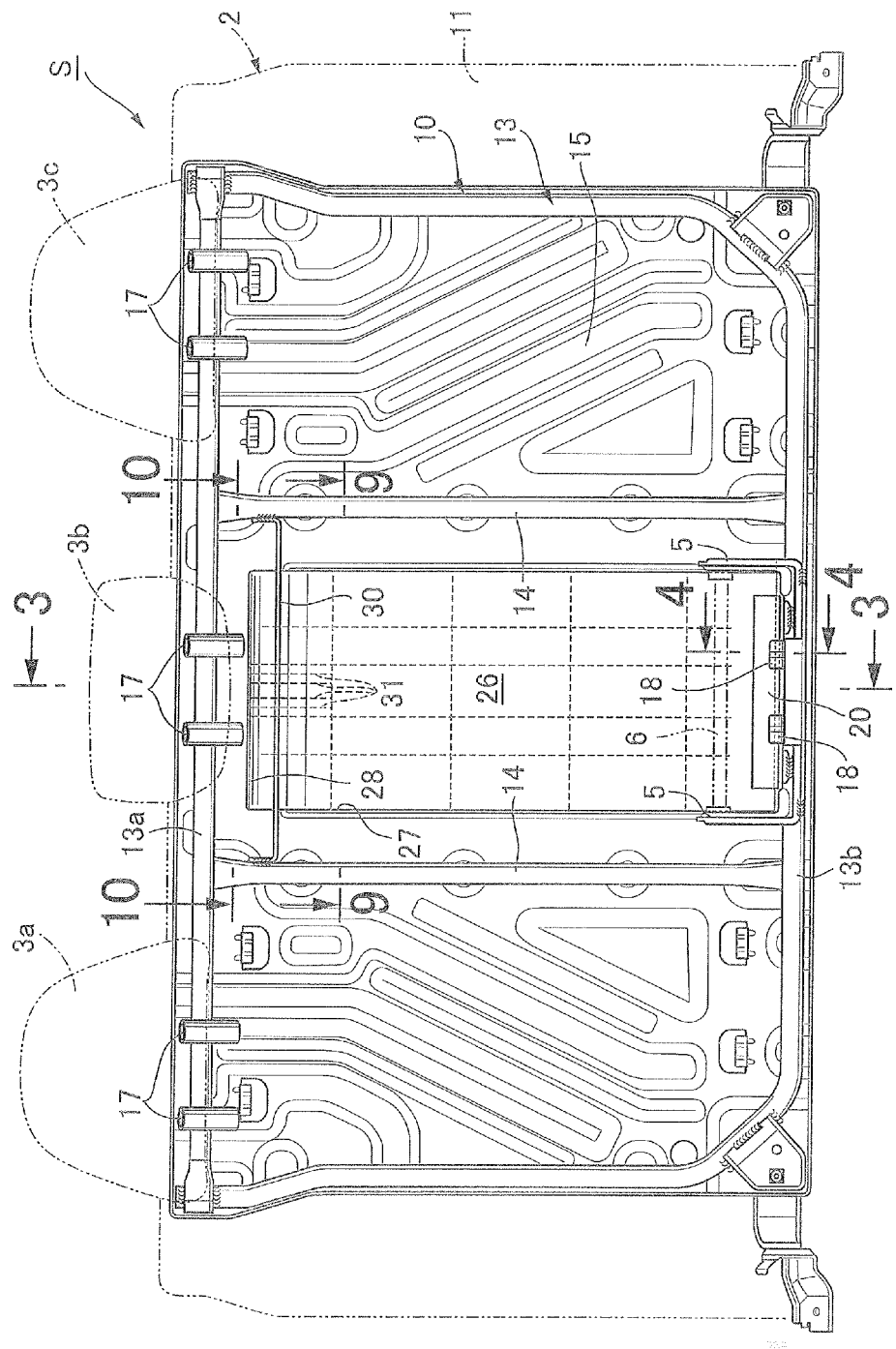
FIG. 2 is a front view showing a portion around a frame of a seat back in FIG. 1.
Figure 3:
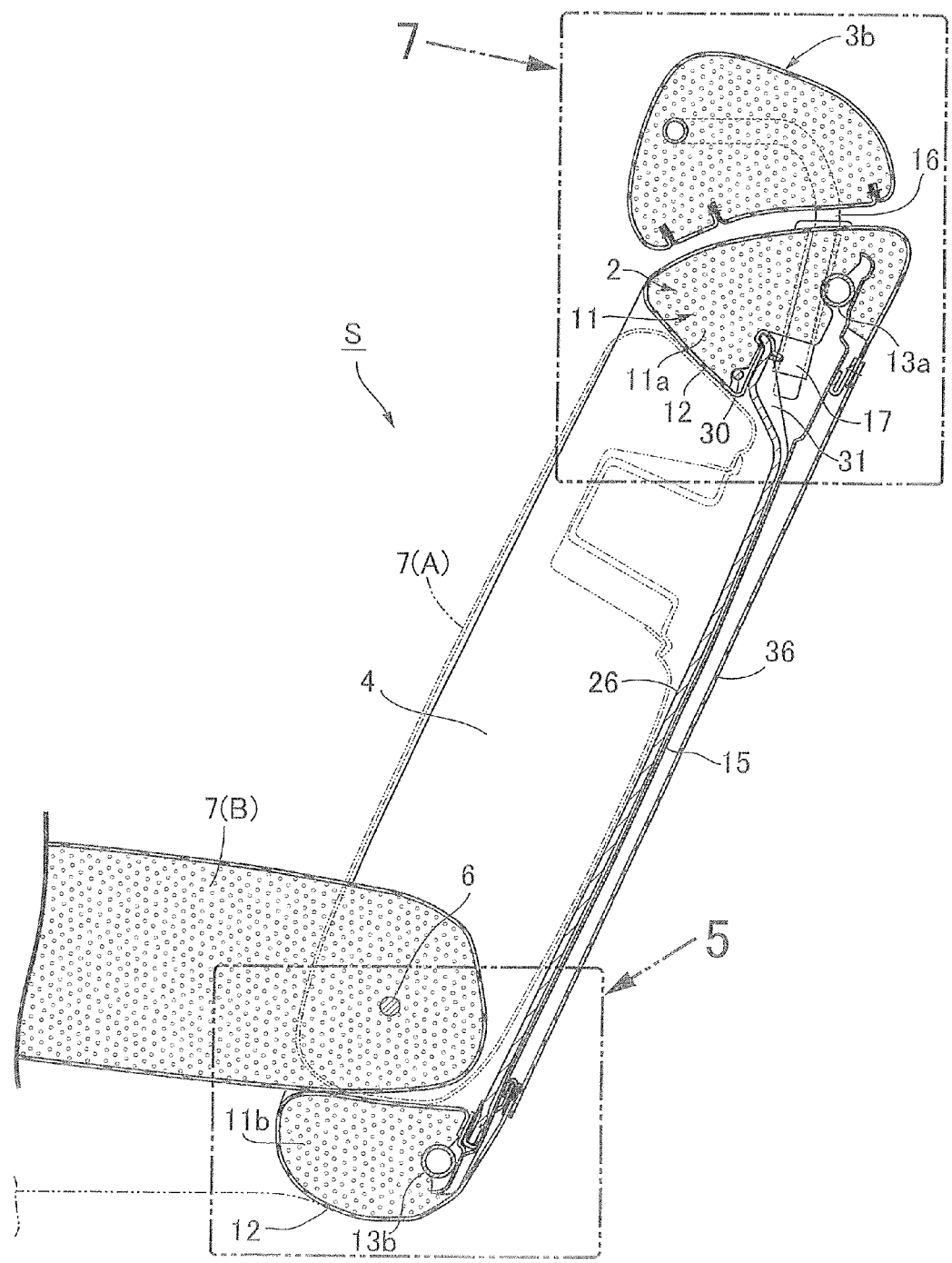
FIG. 3 is a sectional view taken along the line 3-3 of FIG. 2.
Figure 4:
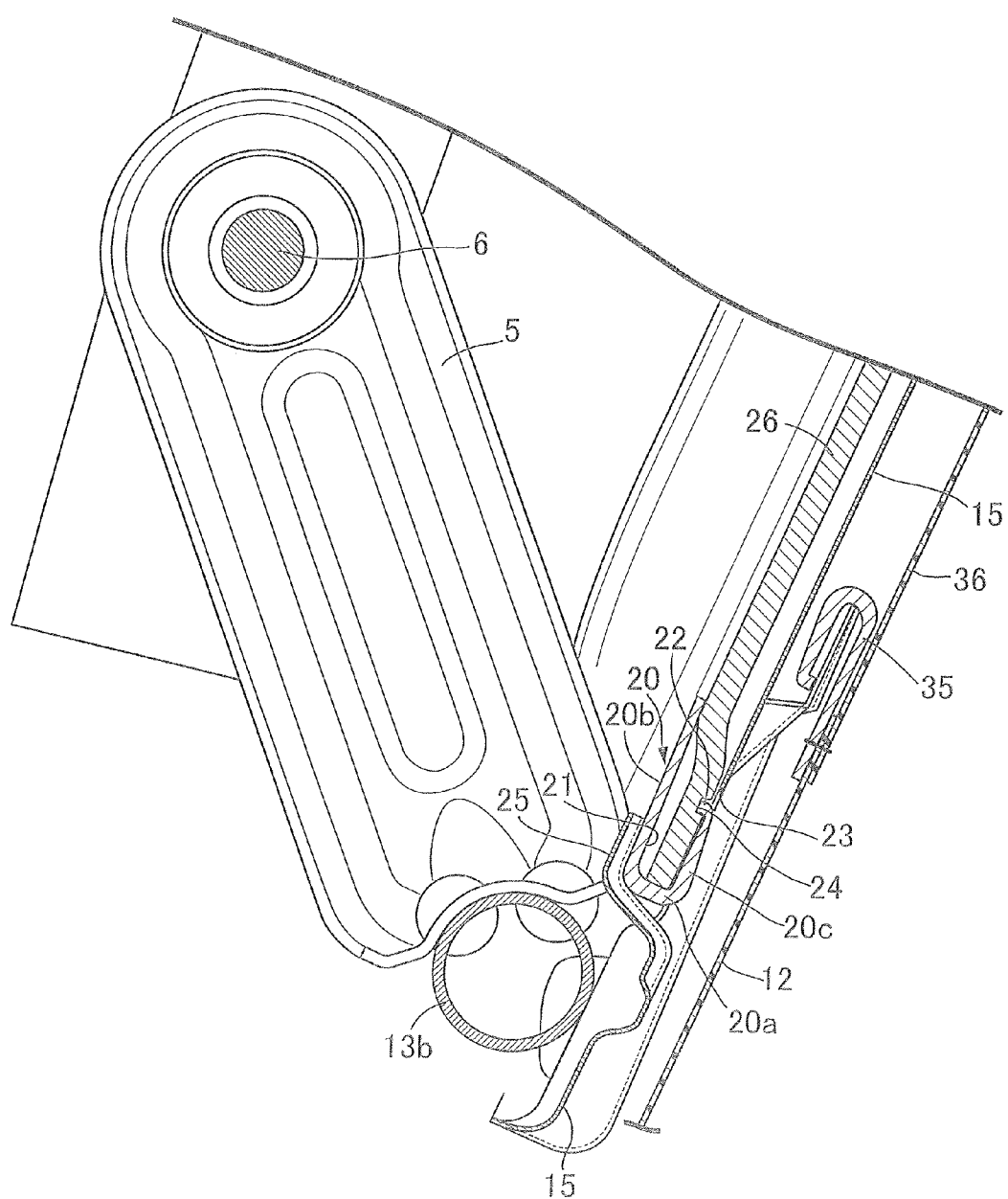
FIG. 4 is an enlarged sectional view taken along the line 4-4 of FIG. 2.

In FIG. 1, in the illustrated example, a seat S is a rear seat for three passengers which is installed on a floor of the automobile, and includes a seat cushion 1, a seat back 2 standing upward from a rear end portion of the seat cushion 1, and three head rests 3a, 3b, and 3c for three passengers which are installed in an upper portion of the seat back 2 and arranged in a left-right direction. Moreover, a housing recessed portion 4 is provided in a center portion of the seat back 2 and an armrest 7 supported, via a pivot 6, by a pair of left and right brackets 5 (see FIGS. 3 and 4) disposed in a lower portion of the housing recessed portion 4 is configured to be turnable between a retracted position A at which the armrest 7 is housed in the housing recessed portion 4 and a protruding position B at which the armrest 7 protrudes forward and placed on the seat cushion 1. A cup holder 8 is provided in an upper surface of the armrest 7 at the protruding position B.

In FIGS. 1 to 3 and FIGS. 5 and 6, the seat back 2 is formed of a frame 10 and a cushion pad 11 supported by the frame 10. A surface of the cushion pad 11 is covered with a skin 12 made of leather or synthetic leather. The housing recessed portion 4 penetrates a center portion of the cushion pad 11 and an upper pad portion 11a and a lower pad portion 11b of the cushion pad 11 are left to exist above and below the housing recessed portion 4.

The frame 10 is formed of: a main frame 13 formed in a substantially rectangular shape to extend along a contour of a back surface of the seat back 2; and a pair of left and right cross pipes 14 connecting an upper side portion 13a and a lower side portion 13b of the main frame 13 to each other, respectively in regions on left and right sides of the housing recessed portion 4. The brackets 5 are fixedly attached to the lower side portion 13b of the main frame 13 by welding or the like and a back panel 15 made of a thin steel plate is fixedly attached to a back surface of the frame 10 by welding or the like.

Moreover, three pairs of left and right supporting tubes 17 respectively supporting pairs of left and right pillars 16 of the three head rests 3a, 3b, and 3c are fixedly attached to the upper side portion 13a by welding or the like.

In FIGS. 3 to 11, an inner board 26 forming a rear wall of the housing recessed portion 4 is attached to the housing recessed portion 4 as follows.

Figure 5:
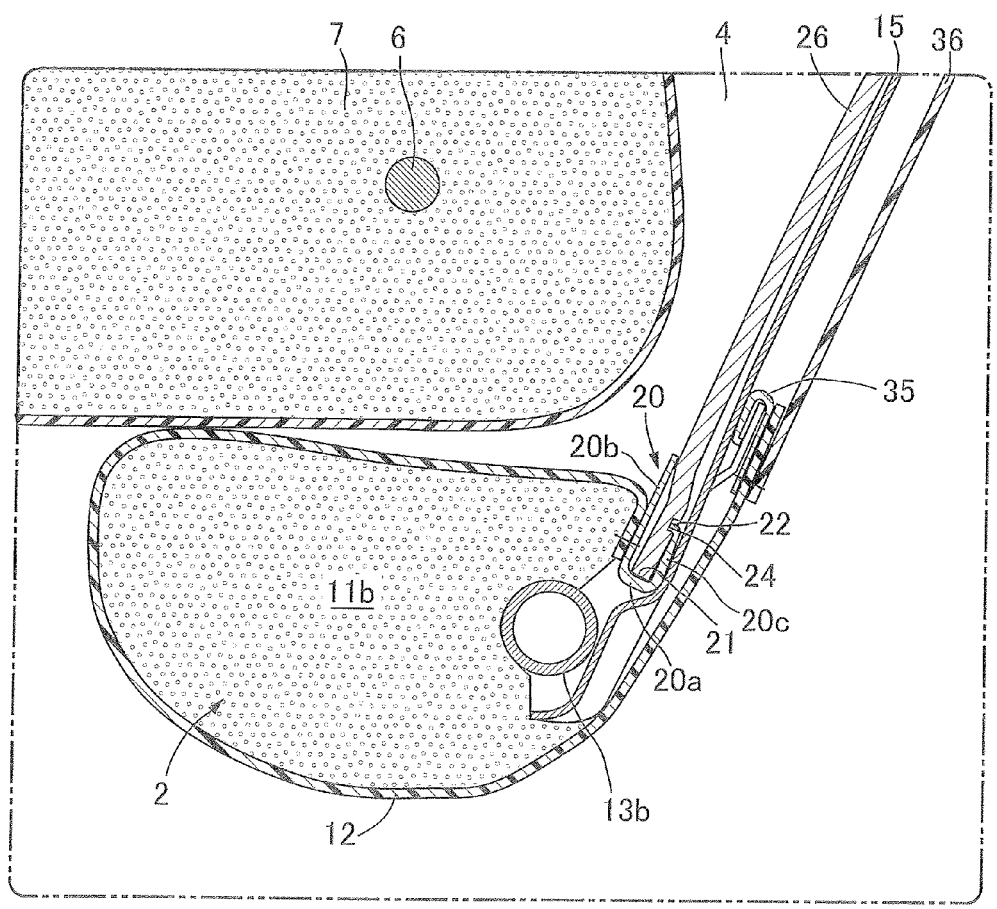
FIG. 5 is an enlarged view of portion 5 in FIG. 3.
Figure 6:
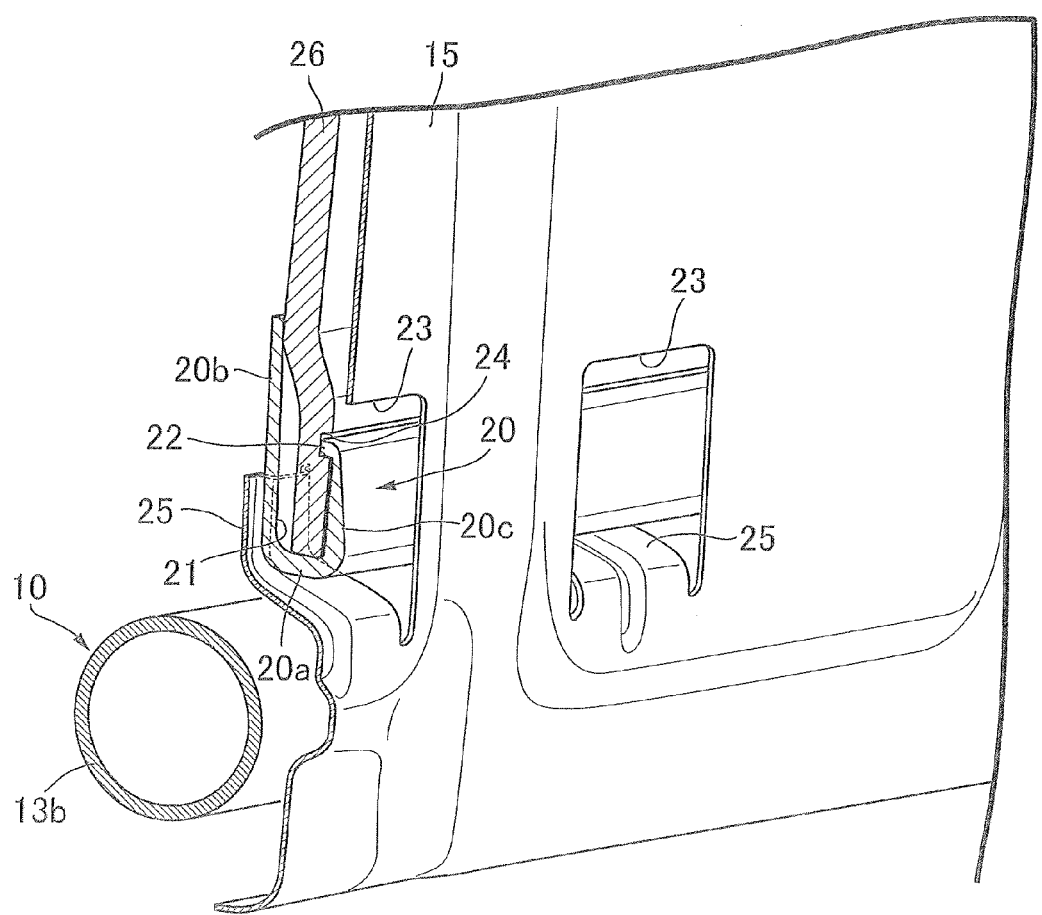
FIG. 6 is a perspective view of a main portion of FIG. 5.

As shown in FIGS. 5 and 6, multiple supporting pieces 25 protruding forward and upward are formed by cutting and bending, from a rear side, at portions of the back panel 15 which correspond to a portion below the housing recessed portion 4. A board supporting member 20 having such a length that the board supporting member 20 can be fit within the entire left-right width of the housing recessed portion 4 is interposed between the back panel 15 and a set of the supporting pieces 25.

The board supporting member 20 is made of synthetic resin and includes: a bottom wall portion 20a; and a front wall portion 20b and a rear wall portion 20c which stand upright respectively from front and rear edges of the bottom wall portion 20a. A U-shaped holding groove 21 whose upper plane is opened is defined by the bottom wall portion 20a, the front wall portion 20b, and the rear wall portion 20c. A locking protrusion 22 protruding in such a way as to be bent to the holding groove 21 side is formed integrally with an upper end portion of the rear wall portion 20c, in a rib shape extending in the left-right direction.

The front wall portion 20b and the rear wall portion 20c extend upward to a level higher than the supporting pieces 25 and the front wall portion 20b extends upward to a level higher than the rear wall portion 20c. Multiple opening portions 23 formed in the cutting and bending of the supporting pieces 25 are left in the back panel 15.

A lower end portion of the inner board 26 is fitted to the holding groove 21 from above and from the front side of the seat back 2 through the housing recessed portion 4. Here, a locking groove 24 is formed in a rear surface of the inner board 26 to extend over the entire width thereof in the left-right direction and the locking protrusion 22 is configured to engage with the locking groove 24. Specifically, when the lower end portion of the inner board 26 is inserted into the holding groove 21, a gap between the front wall portion 20b and the rear wall portion 20c temporarily elastically opens and accepts the lower end portion of the inner board 26. Then, when the locking groove 24 comes to the position of the locking protrusion 22, the gap between the front wall portion 20b and the rear wall portion 20c closes due to forces causing the wall portions to return to their original shapes and the locking protrusion 22 thus engages with the locking groove 24. This engagement prevents the inner board 26 from sliding out upward from the locking groove 24.

A rear end portion of the skin 12 covering an upper surface of the lower pad portion 11b is sewed and attached to the front wall portion 20b of the board supporting member 20.

Figure 7:
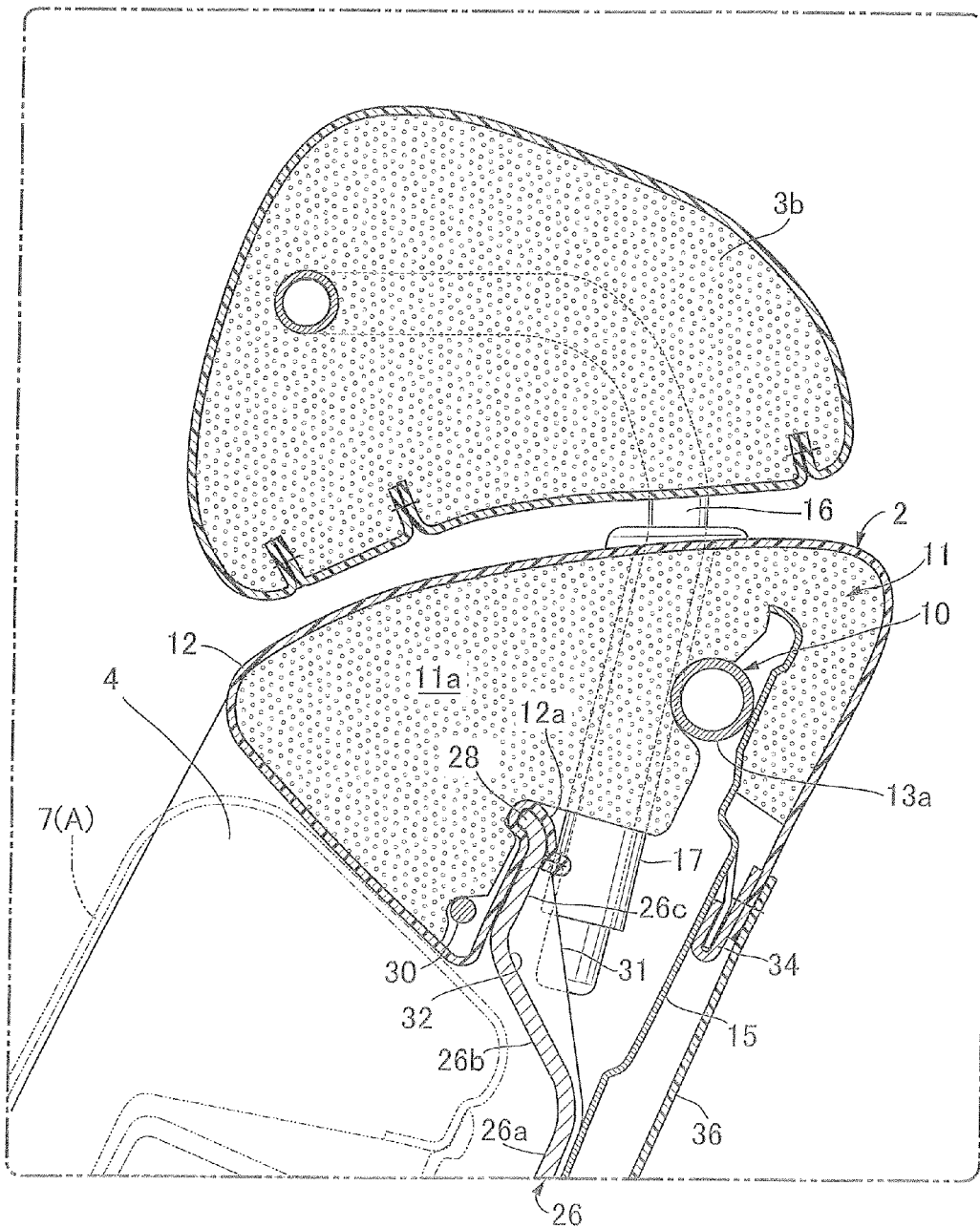
FIG. 7 is an enlarged view of the portion 7 in FIG. 3.
Figure 8:
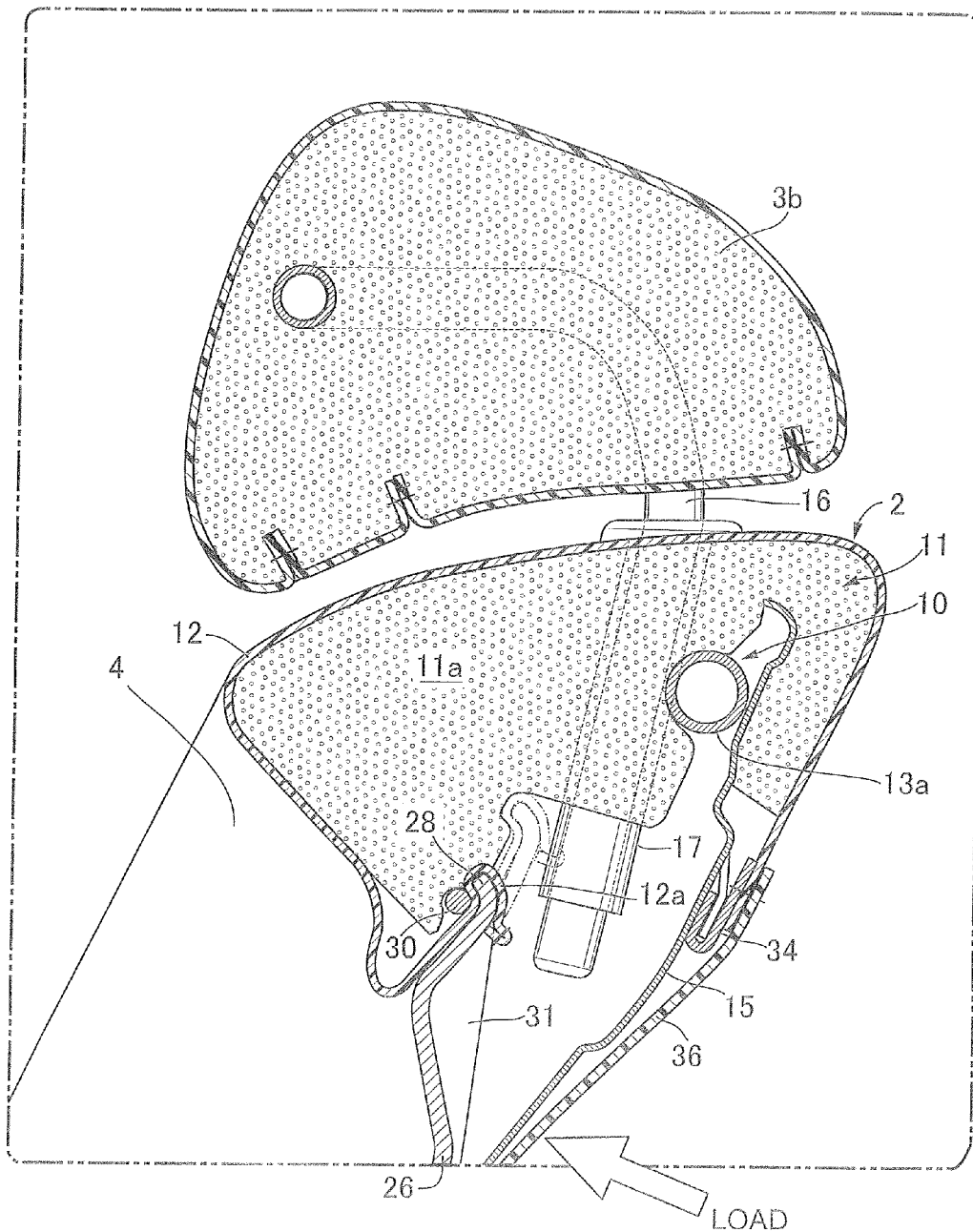
FIG. 8 is an operation explanatory view of an inner board which corresponds to FIG. 7.
Figure 9:
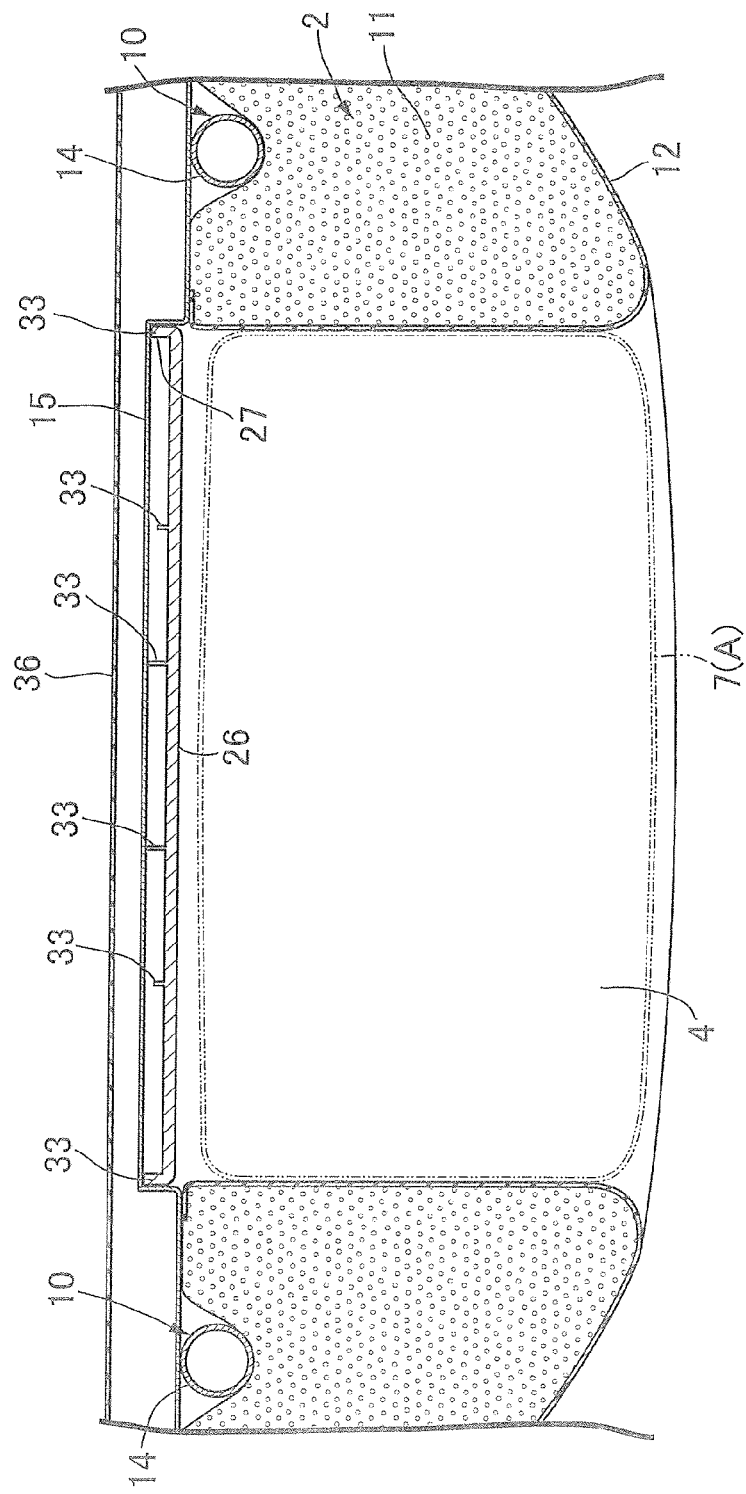
FIG. 9 is an enlarged sectional view taken along the line 9-9 of FIG. 2.
Figure 10:
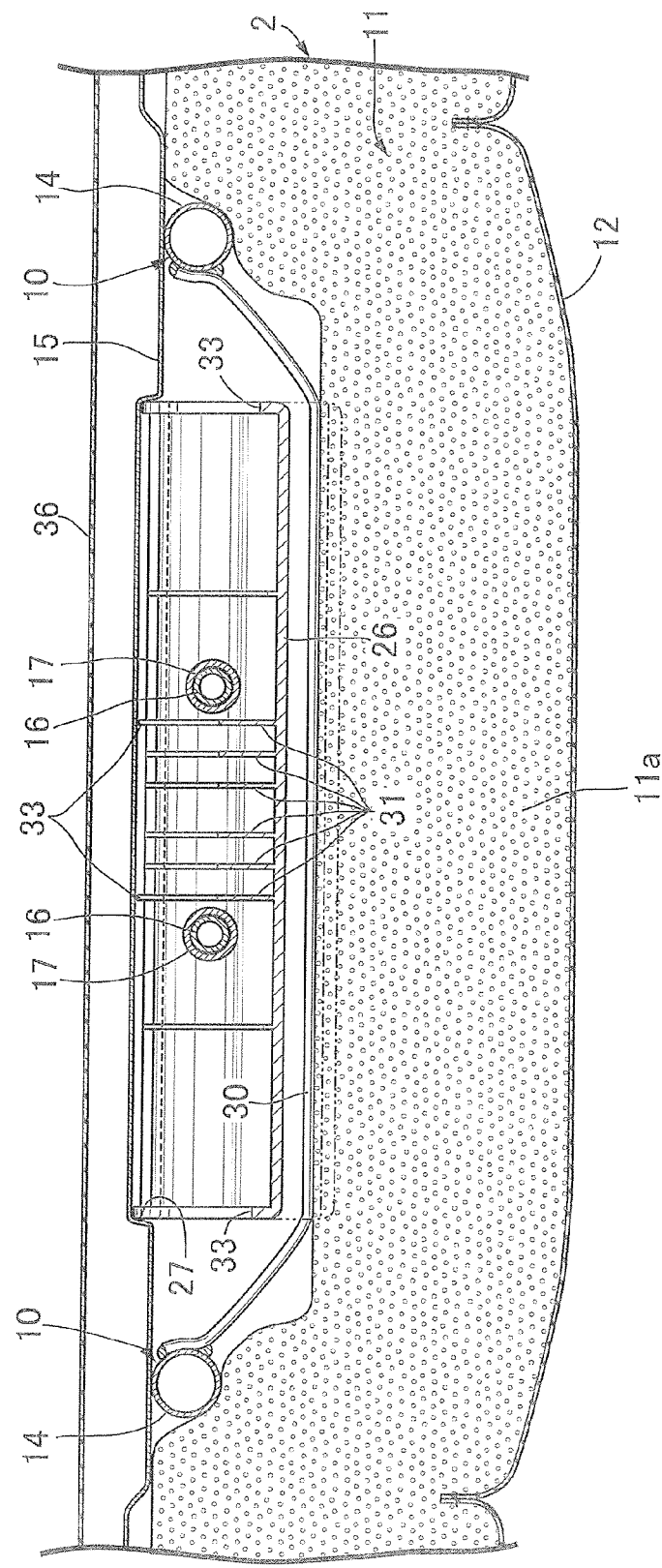
FIG. 10 is an enlarged sectional view taken along the line 10-10 of FIG. 2.
Figure 11:
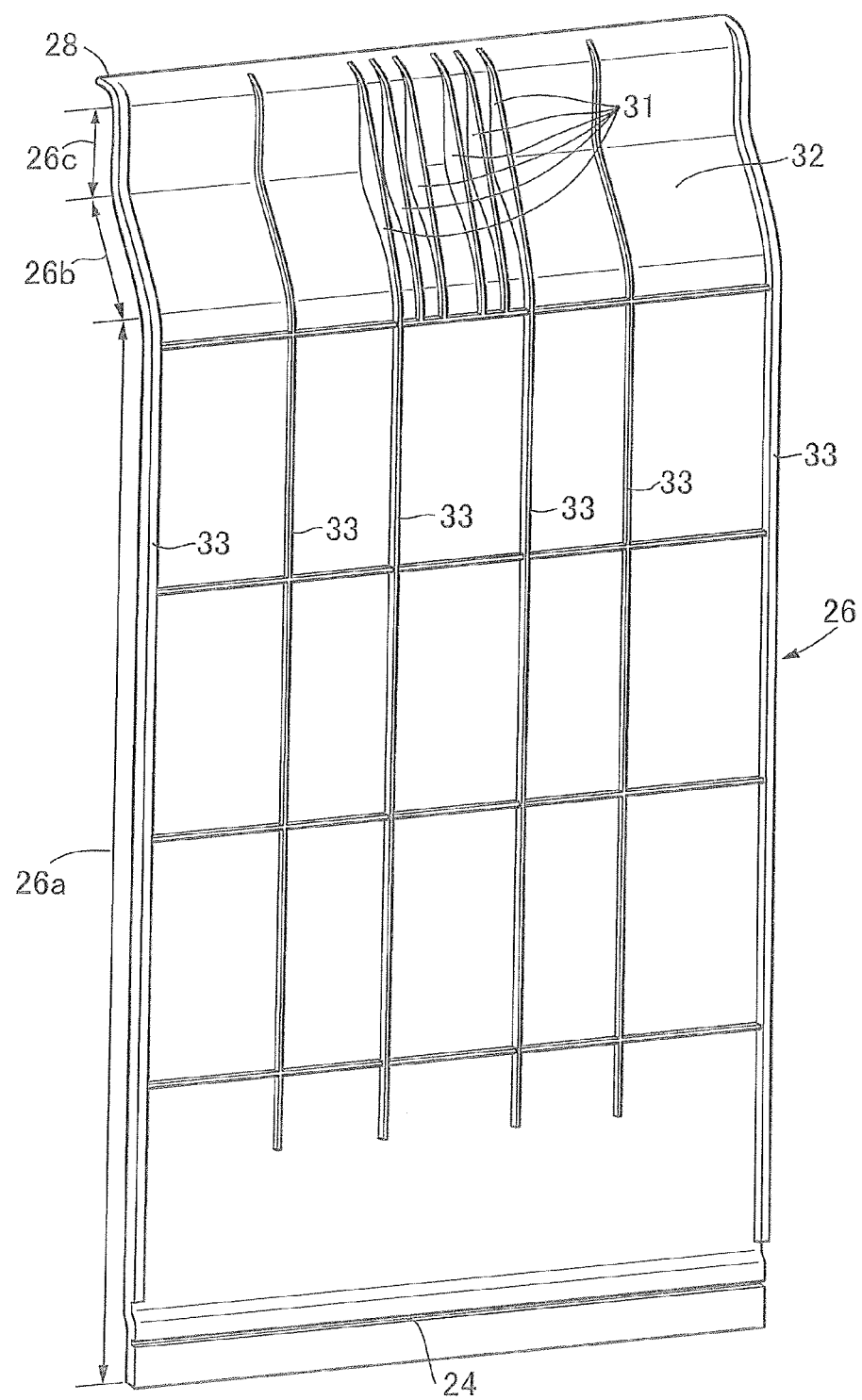
FIG. 11 is a perspective view of the inner board.

As shown in FIG. 7, in the upper pad portion 11a supported by the upper side portion 13a of the main frame 13, a lower end portion of the skin 12 covering the front surface of the upper pad portion 11a extends toward a back side of the housing recessed portion 4 to form a sac-shaped portion 12a. After the sac-shaped portion 12a is placed over an upper end portion of the inner board 26 whose lower end portion is fitted to the holding groove 21, the upper end portion of the inner board 26 is moved toward the back side of the housing recessed portion 4 with an intermediate portion of the inner board 26 largely bent forward and then the inner board 26 is made to return to its original shape by the elastic restoring force thereof. As a result, the upper end portion of the inner board 26 is elastically supported by a lower rear surface of the upper pad portion 11a of the cushion pad 11 together with the sac-shaped portion 12a and the inner board 26 is also pressed to come into contact with the back panel 15 by a reaction force of the upper pad portion 11a. Here, as shown in FIG. 9, a relatively shallow positioning recessed portion 27 is formed in a front face of the back panel 15 and movement of the inner board 26 in the left-right direction is restricted by the engagement of the inner board 26 with the positioning recessed portion 27. The inner board 26 is thus set as a back wall of the housing recessed portion 4.

The rear end portion of the skin 12 covering the entire upper surface of the cushion pad 11 is turned to extend to the back side of the back panel 15 and is sewed and attached to an upper skin supporting member 34 attached to a rear surface of an upper portion of the back panel 15.

As shown in FIGS. 7 to 11, the inner board 26 is formed of: a flat plate portion 26a coming in contact with the back panel 15 while being fitted to the holding groove 21 (FIG. 6); an inclined portion 26b bent forward and upward from the upper end of the flat plate portion 26a to avoid the pair of left and right supporting tubes 17 supporting the head rest 3b at the center position; and a standing portion 26c standing upward from an upper end of the inclined portion 26b. A locking claw 28 bent forward in an arc shape is formed integrally with an upper end of the standing portion 26c. The standing portion 26c and the locking claw 28 are supported by a lower rear surface of the upper pad portion 11a.

Opposite ends of a stopper member 30 facing a lower surface of the locking claw 28 while being in contact with the skin 12 covering a lower surface of the upper pad portion 11a are fixedly attached between the left and right cross pipes 14 in the frame 10 by welding or the like. When the inner board 26 is pressed toward the housing recessed portion 4 side by a load from the rear side and deforms to bend, the locking claw 28 engages with the stopper member 30 via the sac-shaped portion 12a of the skin 12 (see FIG. 8) and frontward and downward movement of the upper end portion of the inner board 26 is thereby suppressed. The stopper member 30 is made of a steel line having a circular section while an inner surface of the locking claw 28 capable of engaging with the stopper member 30 is an arc-shaped surface. Accordingly, a large engagement area between the stopper member 30 and the locking claw 28 is secured.

Moreover, multiple reinforcement ribs 31 integrally connecting the inclined portion 26b and the locking claw 28 are formed on the rear surface of the inner board 26 to increase the stiffness between the inclined portion 26b and the locking claw 28. These reinforcement ribs 31 are each formed in a triangular shape as seen in a side view, which fills a valley portion 32 between the inclined portion 26b and the standing portion 26c, to effectively increase the stiffness between the inclined portion 26b and the locking claw 28. Here, these reinforcement ribs 31 are disposed between the pair of left and right supporting tubes 17 supporting the head rest 3b at the center position to avoid interference with the supporting tubes 17.

Multiple ribs 33 lower than the reinforcement ribs 31 is formed integrally with the rear surface of the inner board 26 to extend over the substantially entire length thereof in an up-down direction to provide appropriate stiffness over the entire inner board 26.

The rear end portion of the skin 12 covering the upper surface of the lower pad portion 11b is sewed and attached to the front wall portion 20b of the board supporting member 20 (see FIG. 5). Moreover, the skin 12 covering the entire lower surface of the cushion pad 11 is sewed and attached to a lower skin supporting member 35 fixedly attached to a back surface of a lower portion of the back panel 15. Furthermore, upper and lower end portions of a cover sheet 36 covering the rear surface of the back panel 15 are sewed and attached to the upper and lower skin supporting members 34, 35 (see FIGS. 3, 5, and 7).

Next, operations of the embodiment are described.

When the armrest 7 is pulled out forward from the housing recessed portion 4 of the seat back 2 to the protruding position B to use the armrest 7, an interior of the housing recessed portion 4 is visible from a vehicle cabin side. However, since a rear opening plane of the housing recessed portion 4 is closed by the inner board 26, a small object is prevented from entering a space on a back side of the seat back 2 by the inner board 26 when the small object falls into the housing recessed portion 4. In addition, an excellent exterior can be achieved.

When luggage in a luggage compartment behind the rear seat S swiftly moves forward due to an inertial force in sudden braking of the automobile and collides with the back panel 15 made of a thin steel plate and the impact load of this collision presses the inner board 26 forward while deforming the back panel 15 forward, upward movement of the inner board 26 is suppressed by the engagement between the locking groove 24 in the lower end portion of the inner board 26 and the locking protrusion 22 of the board supporting member 20. Accordingly, the inner board 26 turns forward about the board supporting member 20 and the locking claw 28 in the upper end portion of the inner board 26 engages with the stopper member 30 together with the sac-shaped portion 12a of the skin 12 while deforming the upper pad portion 11a (see FIG. 8). This suppresses the forward and downward movement of the inner board 26. Hence, it is possible to suppress excessive forward turning and bending of the inner board 26 and secure the durability of the inner board 26. Accordingly, no special load receiving member which receives a load from the rear side to protect the inner board needs to be provided in a rear opening portion of the housing recessed portion 4. Thus, the structure of the vehicle seat device is simplified and the cost can be thereby reduced. Here, the locking claw 28 deforms the cushion pad 11 before engaging with the stopper member 30 and this deformation alleviates engagement impact of the locking claw 28 with the stopper member 30, thereby improving the durability of the locking claw 28.

Moreover, since the upper end portion of the inner board 26 is supported by the rear surface of the cushion pad 11 and the back panel 15 with which the inner board 26 comes into contact upon receiving an elastic rebound force of the cushion pad 11 is fixedly attached to the frame 10 of the seat back 2, the inner board 26 can be supported by utilizing the cushion pad and the back panel which are essentially included in the seat back 2. Hence, the structure of the vehicle seat device can be further simplified.

Furthermore, since the locking claw 28 is formed integrally with the inner board 26, there is no increase in the number of parts due to the locking claw 28 and this can contribute to further simplification of the structure and reduction in cost.

Moreover, since the reinforcement ribs 31 connecting the inner board 26 and the locking claw 28 are formed therebetween, bending between the inner board 26 and the locking claw 28 can be effectively suppressed.

Furthermore, the inner board 26 is formed of: the flat plate portion 26a coming in contact with the back panel 15; the inclined portion 26b bent forward from the upper end of the flat plate portion 26a to avoid the supporting tubes 17 for the head rest 3b which are fixedly provided in the upper portion of frame 10 of the seat back 2; and the standing portion 26c standing upright from the upper end of the inclined portion 26b, the locking claw 28 is formed integrally with the upper end of the standing portion 26c, and the three portions of the locking claw 28, the standing portion 26c, and the flat plate portion 26a are continuously connected together by the reinforcement ribs 31. Accordingly, it is possible to effectively suppress bending of the three portions of the locking claw 28, the standing portion 26c, and the flat plate portion 26a and to increase the stiffness of the locking claw. Thus, excellent engagement between the locking claw 28 and the stopper member 30 can be achieved.

Moreover, since the multiple reinforcement ribs 31 are linearly formed to extend across the valley portion 32 between the inclined portion 26b and the standing portion 26c and the reinforcement ribs 31 are disposed between the pair of left and right supporting tubes 17, the high reinforcement ribs 31 can effectively increase the stiffness of the locking claw 28 and a portion around a base thereof while avoiding interference with the supporting tubes 17 for the head rest 3b.

Furthermore, since the engagement area between the locking claw 28 and the stopper member 30 are made as large as possible by forming the stopper member 30 to have a circular section and by forming the inner surface of the locking claw 28, which is formed to come into contact with the outer peripheral surface of the stopper member 30, to be an arc-shaped surface, an increase in engagement pressure between the locking claw 28 and the stopper member 30 is suppressed and the durability of the locking claw 28 can be secured.

Moreover, in order to suppress the upward movement of the inner board 26, each of the locking protrusion 22 and the locking groove 24 which suppress the upward movement of the inner board 26 by engaging with each other is formed in one or the other of the side surface of the holding groove 21 of the board supporting member 20 and the side surface of the lower end portion of the inner board 26 fitted to the holding groove 21, the side surfaces facing each other. Accordingly, the engagement between the locking protrusion 22 and the locking groove 24 is obtained only by fitting the lower end portion of the inner board 26 to the holding groove 21 and the upward movement of the inner board 26 can be suppressed in a simple manner. Hence, no special fixing member for suppressing separation of the inner board 26 from the holding groove 21 is necessary and the simplification and assemblability of the structure of the vehicle seat device are improved. This can contribute to reduction in cost.

Furthermore, since the locking groove 24 is formed in the side surface of the inner board 26 to extend over the entire width thereof in the left-right direction and the locking protrusion 22 is formed on the inner surface of the holding groove 21, the locking protrusion 22 can engage with the locking groove 24 at any position of the inner board 26 in the left-right direction. Hence, excellent assemblability can be achieved.

Moreover, since the locking protrusion 22 is formed integrally with the board supporting member 20 in a rib shape, an increase in the number of parts due to the locking protrusion 22 is avoided. In addition, the locking protrusion serves as a reinforcement rib and increases the stiffness of the board supporting member 20 and the engagement force with the locking groove 24 can be thereby increased.

Furthermore, the board supporting member 20 includes: the bottom wall portion 20a; and the front wall portion 20b and the rear wall portion 20c which stand upright respectively from the front and rear edges of the bottom wall portion 20a and which define the holding groove 21 therebetween, the locking protrusion 22 is formed to be bent to the holding groove 21 side from the upper end portion of one of the front wall portion 20b and the rear wall portion 20c, and the board supporting member 20 and the locking protrusion 22 are integrally formed. Accordingly, the board supporting member 20 including the locking protrusion 22 is a single part and this can contribute to simplification of the structure of the vehicle seat device. In addition, the board supporting member 20 formed integrally of the bottom wall portion 20a, the front wall portion 20b, and the rear wall portion 20c forms a structure having a channel-shaped section with high stiffness and the inner board 26 can be thereby firmly supported.

Moreover, since the locking protrusion 22 is formed in the rear wall portion 20c and the front wall portion 20b is formed to extend to a level higher than the rear wall portion 20c in the board supporting member 20, the inner board 26 inclines forward about an upper end of the high front wall portion 20b in the board supporting member 20 when the intermediate portion of the inner board 26 is bent forward due to application of a load from the rear side. In response to this inclination, the locking groove 24 in the rear surface of the inner board 26 engages more strongly with the locking protrusion 22 in the upper end portion of the low rear wall portion 20c and the upward separation of the inner board 26 can be thereby effectively suppressed.

Furthermore, since the supporting pieces 25 protruding forward and upward by being cut and bent from the rear side are provided in the back panel 15 fixedly attached to the frame 10 and covering the rear surface of the seat back 2 and the board supporting member 20 is interposed between the back panel 15 and the set of supporting pieces 25, the inner board 26 can be attached to the frame 10 without use of a special supporting member and this can further contribute to the simplification of the structure of the vehicle seat device. In addition, in the back panel 15, since the interposed state of the board supporting member 20 by the back panel 15 and the supporting pieces 25 can be visually checked through the opening portions 23 which are left as a result of cutting and bending of the supporting pieces 25, it is possible to visually check the supported state of the inner board 26 without provision of a dedicated inspection window in the back panel 15 and prevent erroneous assembly.

Figure 12:
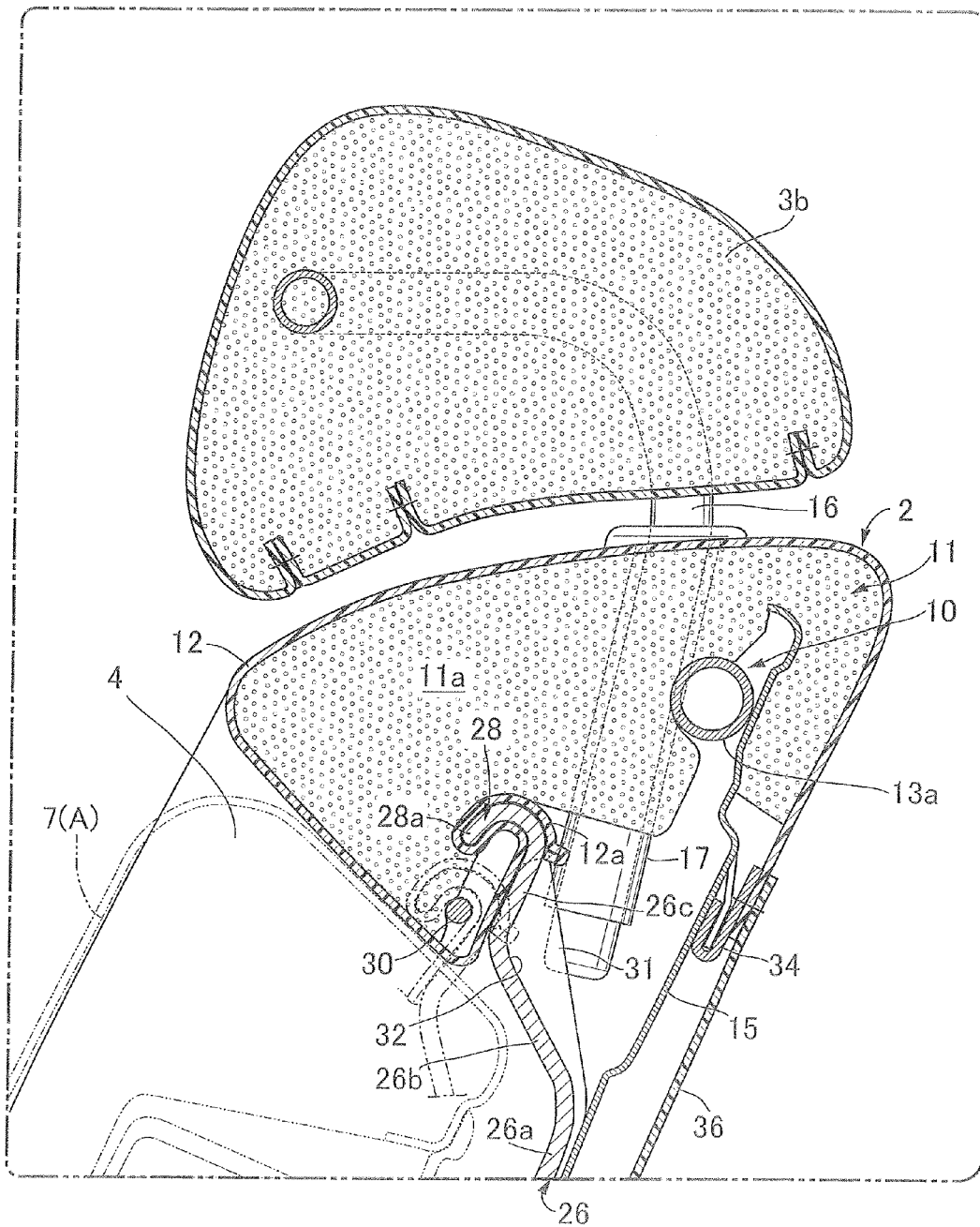
FIG. 12 is a view showing another embodiment of the present invention in a manner corresponding to FIG. 7.

Next, a description is given of another embodiment of the present invention which is shown in FIG. 12.

In the other embodiment, a U-shaped folded-back portion 28a is provided in a locking claw 28 formed in an upper end portion of an inner board 26 and the locking claw 28 can engage with a half of a periphery of a stopper member 30. Since other configurations are the same as those in the previous embodiment, portions corresponding to the previous embodiment are denoted by the same reference numerals in FIG. 12 and overlapping descriptions are omitted.

In the other embodiment, the locking claw 28 engages with the half of the periphery of the stopper member 30 in engagement of the locking claw 28 with the stopper member 30. This engagement can suppresses separation of the locking claw 28 from the stopper member 30 and suppress excessive movement and deformation of the inner board 26 when an inner board 26 is largely bent forward.

The present invention is not limited to the embodiments described above and various design changes can be made within the gist of the invention. For example, instead of the armrest 7, a side table including the cup holder 8 can be housed in the housing recessed portion 4. Moreover, the seat device of the present invention is not limited to that for automobiles and can be used in railroad vehicles, aircrafts, and the like.

What is claimed is:

1. A vehicle seat device comprising:
    a seat back;
    an attached member pivotally supported by the seat back and configured to be turnable between a retracted position at which the attached member is housed in a housing recessed portion formed to penetrate a cushion pad of the seat back and a protruding position at which the attached member protrudes toward a front side of the seat back; and
    an inner board closing a rear opening face of the housing recessed portion, wherein
    a locking claw bent forward is provided in an upper end portion of the inner board, and
    a stopper member provided in a frame of the seat back and configured to suppress frontward and downward movement of the locking claw by engaging with the locking claw, wherein
    the stopper member is disposed to face the locking claw such that a predetermined distance exists between the stopper member and the locking claw in a normal state, and
    when the inner board is pressed while in the normal state and moved forward due to application of a load from a rear side, the locking claw engages with the stopper member.

2. The vehicle seat device according to claim 1, wherein
    the upper end portion of the inner board engages a rear surface of the cushion pad of the seat back,
    a back panel with which the inner board comes into contact upon receiving an elastic rebound force of the cushion pad is fixedly attached to the frame,
    and
    when the inner board is pressed and moved forward due to application of the load from the rear side, the locking claw deforms the cushion pad before engaging with the stopper member.

3. The vehicle seat device according to claim 1, wherein the locking claw is formed integrally with the inner board.

4. The vehicle seat device according to claim 1, wherein the inner board is further provided with a reinforcement rib which is connected between the inner board and the locking claw.

5. The vehicle seat device according to claim 4, wherein
    the inner board includes: a flat plate portion which comes into contact with the back panel; an inclined portion bent forward from an upper end of the flat plate portion to avoid a supporting tube for a head rest, the supporting tube fixedly provided in an upper portion of the frame of the seat back; and a standing portion standing upright from an upper end of the inclined portion,
    the locking claw is formed integrally with an upper end of the standing portion, and
    three portions of the locking claw, the standing portion, and the flat plate portion, respectively, are continuously connected together by the reinforcement rib.

6. The vehicle seat device according to claim 5, wherein
    a plurality of the reinforcement ribs are linearly formed to extend across a valley portion between the inclined portion and the standing portion, and
    the reinforcement ribs are disposed between a pair of the supporting tubes provided respectively on left and right sides.

7. The vehicle seat device according to claim 1, wherein
    the stopper member is formed to have a circular section, and
    an inner surface of the locking claw formed to come into contact with an outer peripheral surface of the stopper member is formed to be an arc-shaped surface.

8. The vehicle seat device according to claim 1, wherein the locking claw is formed to be capable of engaging with a half of a periphery of the stopper member.

9. The vehicle seat device according to claim 2, wherein
    the stopper member is formed to have a circular section, and
    an inner surface of the locking claw formed to come into contact with an outer peripheral surface of the stopper member is formed to be an arc-shaped surface.

10. The vehicle seat device according to claim 3, wherein the stopper member is formed to have a circular section, and
an inner surface of the locking claw formed to come into contact with an outer peripheral surface of the stopper member is formed to be an arc-shaped surface.

11. The vehicle seat device according to claim 2, wherein the locking claw is formed to be capable of engaging with a half of a periphery of the stopper member.

12. The vehicle seat device according to claim 3, wherein the locking claw is formed to be capable of engaging with a half of a periphery of the stopper member.

* * * * *